(12) United States Patent
Zhao et al.

(10) Patent No.: US 7,555,650 B1
(45) Date of Patent: Jun. 30, 2009

(54) TECHNIQUES FOR REDUCING THE COMPUTATIONAL COST OF EMBEDDING INFORMATION IN DIGITAL REPRESENTATIONS

(75) Inventors: Jian Zhao, Rumford, RI (US); Niels Thorwirth, Providence, RI (US)

(73) Assignee: Thomson Licensing, Boulogne-Billancourt (FR)

( * ) Notice: Subject to any disclaimer, the term of this patent is extended or adjusted under 35 U.S.C. 154(b) by 1201 days.

(21) Appl. No.: 10/390,215

(22) Filed: Mar. 17, 2003

Related U.S. Application Data (60) Provisional application No. 60/365,713, filed on Mar. 20, 2002.

(51) Int. Cl.
*H04L 9/00* (2006.01)
*H04K 1/00* (2006.01)
*G06F 11/30* (2006.01)
*G06F 11/14* (2006.01)
*H04N 7/167* (2006.01)
*G09C 3/00* (2006.01)
*G09C 5/00* (2006.01)
*G06K 9/00* (2006.01)

(52) U.S. Cl. .................. 713/176; 713/188; 713/168; 380/54; 380/200; 380/203; 380/277; 380/278; 382/100; 382/115; 382/118; 382/124

(58) Field of Classification Search .................. None
See application file for complete search history.

(56) References Cited

U.S. PATENT DOCUMENTS 5,822,432 A * 10/1998 Moskowitz et al. ........... 380/28

(Continued)

FOREIGN PATENT DOCUMENTS

WO    WO 00/56059    *   9/2000

(Continued)

OTHER PUBLICATIONS

Dan Boneh and James Shaw, "Collusion-Secure Fingerprinting for Digital Data", Sep. 1998, IEEE Transactions On Information Theory, vol. 44, No. 5.*

*Primary Examiner*—Kimyen Vu
*Assistant Examiner*—Arezoo Sherkat
(74) *Attorney, Agent, or Firm*—Robert D. Shedd; Joseph J. Opalach; Catherine A. Ferguson (57) ABSTRACT

The computational cost of embedding information in a digital representation is reduced by making a set of at least two copies of the digital representation and altering subdivisions of the copies so that corresponding subdivisions in the copies are distinguishable from each other. The subdivisions may be arbitrary or may be functional subdivisions of the digital representation. The subdivisions may be distinguishable by features such as watermarks that do not affect the way in which the digital representation is normally used. The marked copy in which the information is embedded is then made by selecting a given subdivision in the marked copy from one of the set of copies. Selection may be done using a selection string that has an element for each subdivision. The value of the element indicates which of the set of digital representations the subdivision corresponding to the element is to be selected from. The result of this procedure is a sequence of distinguishable subdivisions in the marked copy, and the sequence carries the embedded information. Each marked copy may have a unique sequence, in which case the sequence functions as a fingerprint for the copy. The sequence may also encode information. Examples are an identification of the recipient of the copy, information about the transaction that resulted in the copy being made, or encoded information about the content of the marked copy.

25 Claims, 3 Drawing Sheets

U.S. PATENT DOCUMENTS

| | | | | |
|---|---|---|---|---|
| 6,064,764 | A * | 5/2000 | Bhaskaran et al. | 382/183 |
| 6,373,960 | B1 | 4/2002 | Conover et al. | |
| 6,590,995 | B1 * | 7/2003 | Schwenk et al. | 382/100 |
| 6,792,130 | B1 * | 9/2004 | Jones et al. | 382/100 |
| 7,036,024 | B2 * | 4/2006 | Watson | 726/22 |
| 7,058,809 | B2 * | 6/2006 | White et al. | 713/176 |
| 2002/0012445 | A1 | 1/2002 | Perry | |
| 2002/0016922 | A1 * | 2/2002 | Richards et al. | 713/200 |
| 2002/0099947 | A1 * | 7/2002 | Evans | 713/193 |
| 2003/0009669 | A1 * | 1/2003 | White et al. | 713/176 |
| 2003/0084306 | A1 * | 5/2003 | Abburi et al. | 713/188 |
| 2003/0202679 | A1 * | 10/2003 | Rodriguez | 382/100 |
| 2004/0008864 | A1 * | 1/2004 | Watson et al. | 382/100 |
| 2005/0025463 | A1 * | 2/2005 | Bloom et al. | 386/96 |
| 2005/0129270 | A1 * | 6/2005 | Prakash | 382/100 |
| 2007/0258583 | A1 * | 11/2007 | Wajs | 380/42 |

FOREIGN PATENT DOCUMENTS

| | | | |
|---|---|---|---|
| WO | WO 0056059 | * | 9/2000 |

* cited by examiner

TECHNIQUES FOR REDUCING THE COMPUTATIONAL COST OF EMBEDDING INFORMATION IN DIGITAL REPRESENTATIONS

CROSS REFERENCES TO RELATED APPLICATIONS

The present patent application claims priority from U.S. provisional patent application 60/365,713, Jian Zhao, Niels Thorwirth, Methods and apparatus for efficiently fingerprinting encoded media data, filed Mar. 20, 2002

BACKGROUND OF THE INVENTION

1. Field of the Invention

The invention relates generally to techniques for embedding information in digital representations and more particularly to techniques for embedding information that have reduced computational costs.

2. Description of Related Art

Digital watermarking is a technique for embedding information in a digital representation which remains invisible when the digital data is used to produce an analog output such as an image, a video display, sound, or a printed document. The information remains invisible to the person perceiving the analog output because it is added to the digital data in such a fashion that it becomes part of the noise that is an inevitable part of any analog output. To give a simple example: the digital representations of gray-scale pictures are made up of pixels whose values represent black, white, and a range of grays between black and white. Small changes in the values of individual pixels in the gray scale image will not be perceptible to the viewer when the image is displayed or printed. To make a digital watermark in the image, one need only add a pattern of such small changes to the digital representation. To read the watermark in the digital representation, one need only know what pixels are part of the pattern, what changes were made, and how these changes are to be interpreted. The pattern may represent a message, for example, the name of the owner of the copyright in the image, it may simply serve to detect copying or alteration of the image, or it may uniquely identify the image, or it may do some or all of these things at once. In the broadest sense, a watermark may be any information which is added to a digital representation that does not affect the manner in which the digital representation functions. For example, a word processing document may be watermarked by slightly altering the manner in which particular lines of the document are justified, or program code may be watermarked by making a change which does not affect the program code's function, for example, by adding a function which does nothing. In the following, the term watermark is to be understood in this broadest sense, as well as in its more traditional sense of information that is hidden in the digital representation.

The use of watermarking to uniquely identify a digital representation is termed digital fingerprinting, the watermark itself is termed a fingerprint, and a digital representation that contains a fingerprint is termed a fingerprinted digital representation. Because a fingerprinted digital representation is uniquely identified by its fingerprint, the fingerprint can be used to relate the digital representation to a specific transaction. For example, if the fingerprint in a fingerprinted digital representation relates the fingerprinted digital representation to a particular customer and a digital representation with the same fingerprint appears elsewhere, it is clear that the fingerprinted digital representation has been misappropriated and depending on the circumstances, the customer may be held liable for the misappropriation.

Widespread use of fingerprinted digital representations has been hindered by the computational cost of individually watermarking multiple copies of a digital representation. The computational cost is particularly important where digital representations are being streamed on demand across a network to a consuming device such as a PC or a digital video or audio device. When a digital representation is being streamed to a consuming device, the consuming device does not download the complete digital representation and then begin processing the digital representation, but instead starts processing the digital representation as soon as it receives the first part of it and continues processing the digital representation as it receives it. Streaming has two advantages: it reduces the delay before the consuming device can begin processing the downloaded data and thus playing music or displaying a video and it greatly reduces the amount of memory required in the consuming device, since the consuming device need not store the entire digital representation. Of course, the larger the digital representation, the more important these advantages become.

The computational cost of fingerprinting streaming digital representations is important because making the fingerprint reduces the speed with which a fingerprinted copy can be made and thus increases the time to respond to the user's request for the streamed copy. Components of the computational cost include the large size of the representations, which require the alteration of many bits, and the computational costs of the cryptographic techniques used to hide the fingerprints. The fingerprint must of course be hidden because it could otherwise be removed when the digital representation was misused. Even where the copy is not being streamed, the computational cost may be important in any situation where large numbers of uniquely identified copies are being distributed via the network. Virtually any kind of digital data may be fingerprinted. Examples are copies of digital representations of still images, program code, plain text, or formatted text.

Use of watermarks generally in streaming data has been hindered by the fact that many kinds of streaming data are encoded or compressed from a digital original into a format such MPEG-1, 2, or 4 for video or MPD for audio. Any watermark applied to the digital original is seriously damaged in the encoding and/or compression processes, while applying the watermark to the encoded or compressed version of the original has the problems of computational cost mentioned above.

It is thus an object of the invention disclosed herein to reduce the computational cost of fingerprinting or otherwise marking a copy of a digital representation.

SUMMARY OF THE INVENTION

The object of the invention is attained by making a set of at least two of versions of the digital representation. The versions have corresponding subdivisions and the subdivisions in each of the versions are distinguishable from the corresponding subdivisions in each of the other versions. A marked copy is assembled from subdivisions selected from different ones of the version, and the marked copy's sequence of distinguishable subdivisions marks the copy.

Other aspects of the invention include:

Making the subdivisions distinguishable by using techniques such as watermarks that do not affect the manner in which the digital representation is normally used.

Making the subdivisions distinguishable by associating them with distinguishable headers or by encoding them in fashions which make them distinguishable.

Selecting the subdivisions and making them distinguishable such that encoding and/or compression of the digital representation does not render them indistinguishable.

The sequence of subdivisions encodes information about the copy. Kinds of information that may be encoded include information about a transaction involving the copy, information that renders the copy traceable, or information that is contained in the copy.

A number of marked copies may be assembled from the versions. The marks may identify subsets of the marked copies and may also uniquely identify the marked copy and thereby serve as the marked copy's fingerprint. The sequence that identifies a subset of the marked copies or uniquely identifies an individual one thereof may encode information about the copy. A sequence that uniquely identifies an individual marked copy may further function as an anti-collusion unit in the copy.

A selection string may be used to select the subdivisions from the set of versions. Each element of the selection string corresponds to a subdivision and each element's value specifies one version of the set. The marked copy is assembled by selecting the subdivision corresponding to an element of the string from the version specified by the element's value. If there are sufficient versions and sufficient subdivisions in the versions, the selection string can specify a unique sequence of subdivisions for each copy and thereby specify a fingerprint.

The operations of the technique may be distributed among clients and servers; examples include clients that provide authentication information and servers that verify the authentication information and then assemble the marked copy, servers that provide the digital representation to clients which make the versions and assemble the marked copy, and servers that provide the versions to clients, which then assemble the marked copy.

Other objects and advantages will be apparent to those skilled in the arts to which the invention pertains upon perusal of the following Detailed Description and drawing, wherein:

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

The following Detailed Description will first provide an overview of the invention as it is applied to fingerprinting streamed digital data and will then discuss details of the invention and applications of the invention.

Figure 1:
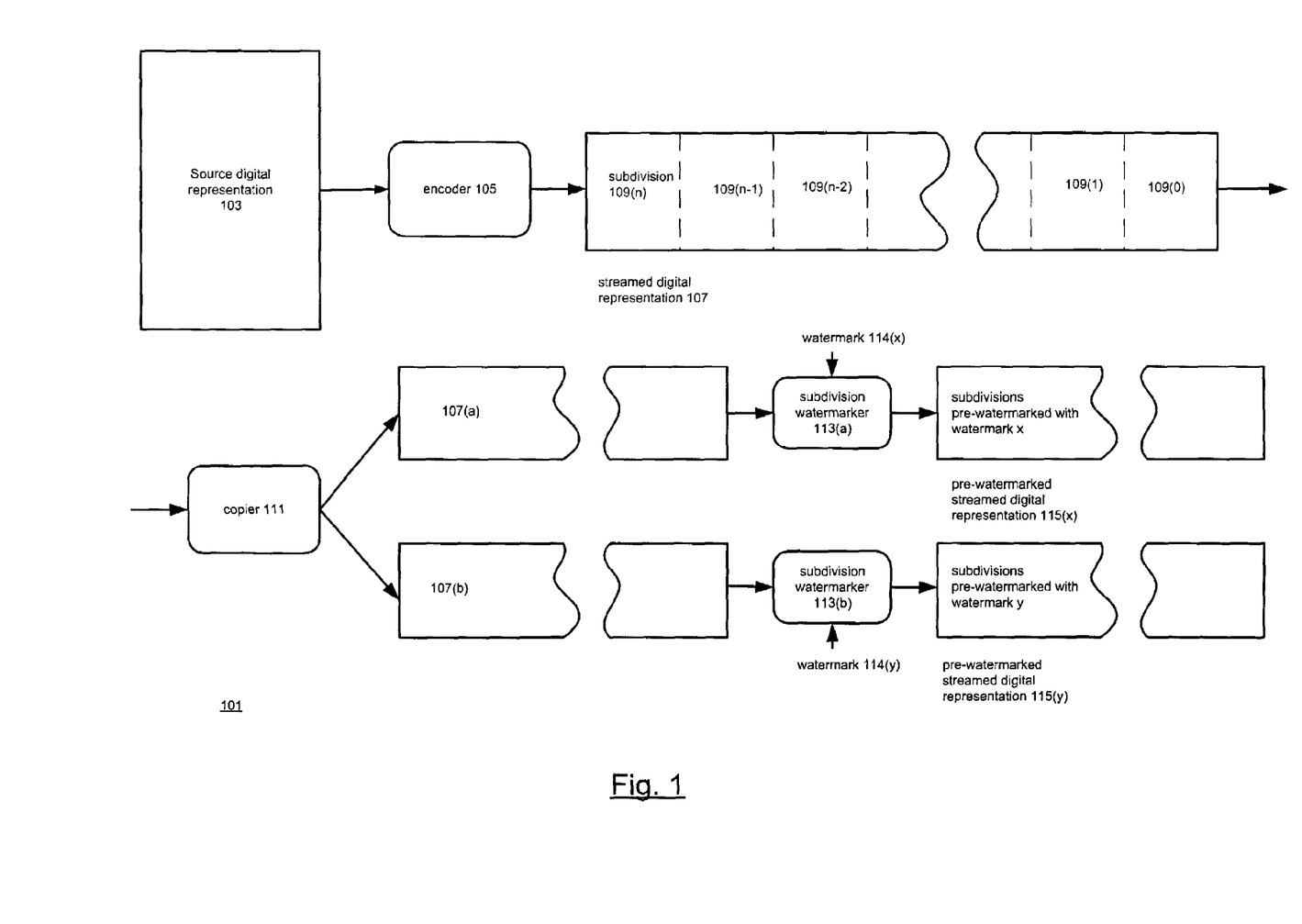
FIG. 1 shows how watermarked streamed digital representations may be made from a source digital representation.
Figure 2:
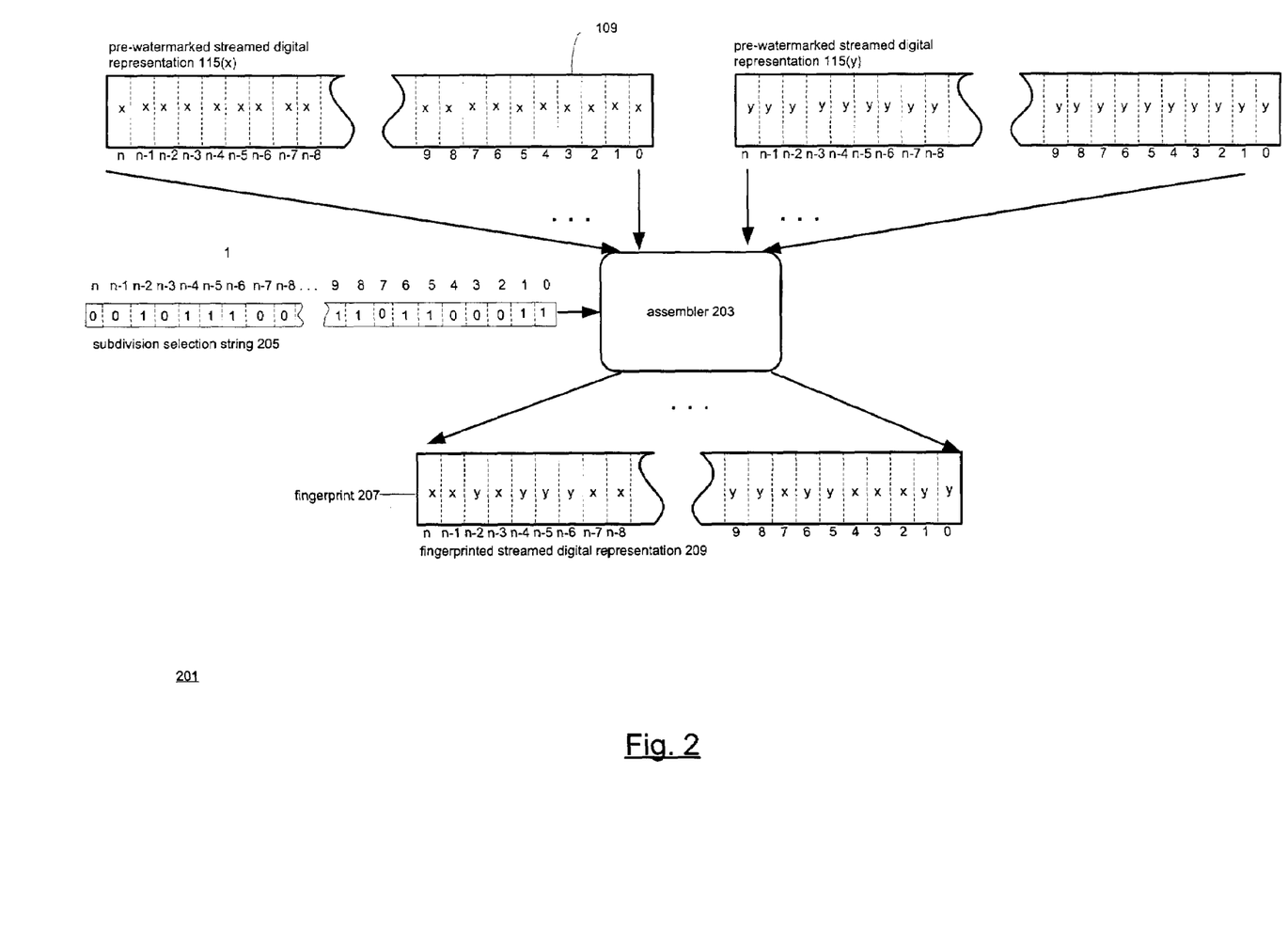
FIG. 2 shows how a fingerprinted streamed digital representation may be made from the watermarked streamed representations of FIG. 1.

Overview of Fingerprinting: FIGS. 1 and 2

FIG. 1 shows how a streamed digital representation is made from a source digital representation and how copies of the streamed digital representation are watermarked in preparation for the fingerprinting operation. Source digital representation 103 is taken here to be an unencoded digital representation of a video, for example. As is well known in the prior art, when such digital representations are streamed, they are typically processed by an encoder 105 to produce an encoded streamed digital representation 107 which is considerably smaller than the source digital representation 103. Streamed digital representation 107 contains a number of subdivisions 109(0 . . . n). The nature of these subdivisions depends on what streamed digital representation 107 represents and how it is made. The subdivisions are here shown as being of equal length, but they may be of varying lengths; the only requirement is that they be clearly recognizable in digital representation 107.

In preparation for making fingerprinted versions of streamed digital representation 107, two identical copies of streamed digital representation, copy 107(a) and 107(b) are made in copier 111; like encoder 105, copier 111 is typically a program executing on a processor that has access to storage in which digital representations 103 and 107 are stored. Copies 107(a) and (b) are used to make pre-watermarked streamed digital representations 115(x) and 115(y). The digital representations are made by subdivision watermarkers 113, which add a watermark to each subdivision 109 in each of the copies 107(a) and (b). The watermarkers add one watermark to each subdivision 109 in copy 107(a) and a different watermark to each subdivision 109 in copy 107(b). In FIG. 1, the watermark added to copy 107(a) is represented by x and the watermark added to copy 107(b) is represented by y. Consequently, pre-watermarked streamed digital representation 115 which has watermark x is designated pre-watermarked representation 115(x), while the pre-watermarked representation which has watermark y is designated pre-watermarked representation 115(y). The watermarkers are also typically implemented by a program executing on a processor and may process copies 107(a) and (b) in parallel or serially.

FIG. 2 shows how a fingerprinted streamed digital representation 209 is made from pre-watermarked digital representations 115(x) and (y). As shown in detail in FIG. 2, each subdivision 109(0 . . . n) in digital representation 115 caries the watermark represented by x and each subdivision 109(0 . . . n) in digital representation 115(y) carries the watermark represented by y. Except for the watermarks, pre-watermarked digital representations 115(x) and (y) are identical to each other and to streamed digital representation 107, and the watermarks do not noticeably affect the behavior of the digital representation that includes them when the digital representation is used for its intended purpose. Because that is the case, a subdivision 109(i) of digital representation 115(x) is functionally equivalent to subdivision 109(i) of digital representation 115(y) and streamed digital representations can be made in which subdivisions 109 from digital representation 115(x) are combined with subdivisions 109 from digital representation 115(y). Such combined digital representations are functionally equivalent to streamed digital representation 107.

Fingerprinted streamed digital representations are made by combining subdivisions from digital representation 115(x) and digital representation 115(y) so that each combination contains a unique sequence of the watermarks x and y. Each of the sequences thus uniquely marks the digital representation to which it belongs. The sequence will thus be termed in the following a mark. Digital representations 115(x and y) each have n subdivisions 109; combining the subdivisions can thus produce $2^n$ unique sequences of watermarks x and y or $2^n$ unique marks or $2^n$ digital representations 209 that are uniquely identified by the marks and are functionally equivalent to streamed digital representation 107. The mark in digital representation 209 is digital representation 209's fingerprint 207. As shown in FIG. 2, the subdivisions 109 from digital representations 115($x$ and $y$) are combined by an assembler 203; assembler 203 is typically implemented by a program executing on a processor whether assembler 203 selects a subdivision from representation 115($x$) or 115($y$) is determined by subdivision selection string 205. Selection string 205 has an element corresponding to each of the watermarked subdivisions in pre-watermarked digital representations 115($x$ and $y$), or in this case, n elements. Since there are only two elements here, selection string 203 may be a simple bit string, with '0' indicating that the subdivision corresponding to the element be selected from one of the digital representations 115 (here, 115($x$)) and '1' indicating that the subdivision corresponding to the element be selected from the other (here, 115($y$)). Thus, it can be seen that the distribution of subdivisions with x and y watermarks in digital representation 209 corresponds to the distribution of '0' digits and '1' digits in selection string 205. What is distributed to customers for the streamed digital representation made from source digital representation 103 is digital representations 209; since each fingerprint 207 is unique, each digital representation 209 can be associated with a transaction. One simple way of doing this is to include the subdivision selection string 205 used to make the fingerprint in the record for the transaction; another is to encode information about the transaction in subdivision selection string 205.

The watermarking technique just described offers a number of advantages:

The watermarks are computed and embedded only twice, namely when the representations 115($x$ and $y$) are made; since that is so, the whole panoply of watermarking and cryptographic techniques can be applied to hide the watermark and encrypt its contents;

The watermark is made in streamed digital representation 209 by a simple copy operation that is in any case necessary to produce the customer's digital representation;

Because the watermark is made in streamed digital representation 209, it is not affected by the encoding done in encoder 105;

The only overhead involved in changing the watermark is changing the subdivision selection string; this in turn makes fingerprinting computationally affordable; further the watermark can be easily associated with transaction and/or recipient information; and A large number of different watermarks can be easily made in large scale applications such as video on demand. All that is required is to adjust the size of the subdivisions and the length of the part of the streamed digital representation containing the watermark as required to make watermarks of the required length.

Use of the technique is of course not limited to streamed digital representations. It may be used with any digital representation that can be divided into subdivisions which may be made distinguishable from one another. Indeed, in the fingerprinting system of FIG. 2, only one of digital representations 115 need be pre-watermarked, since the subdivisions in the prewatermarked version are distinguished by the presence of the watermark from those in the version that is a simple copy of the streamed digital representation 107. For example, a mark may be applied directly to source digital representation 103 in FIG. 1. In such a case, copier 111 would make two copies of source digital representation 103, subdivisions 109 in source digital representation 103 in one of the copies would be watermarked as just described to make copies 103($x$ and $y$) of source digital representation with distinguishable subdivisions 109, and the copies of source digital representation 103 that were being distributed would be made from the pre-watermarked and unwatermarked copies in the same fashion that digital representation 209 is made from digital representations 115($x$ and $y$).

It is of course particularly advantageous if making the subdivisions distinguishable does not affect the behavior of the digital representation in normal use, but that is not a requirement for making the marks. Examples of ways of making the subdivisions distinguishable without using watermarks include the following: adding headers to the subdivisions, with the header having one value in digital representation 115($x$) and another in digital representation 115($y$). If the subdivisions represent units of the original digital representation that are encoded, the subdivisions may be made distinguishable by using different encoders and/or different encoding parameters to make the subdivisions. The subdivisions may further be distinguishable from each other in more than one way, which in turn makes it possible to apply more than one copy of a mark to a digital representation.

While the low cost of changing the sequence of subdivisions in digital representation 209 makes the technique particularly useful for fingerprinting, there is no requirement that only one copy of a particular assembled digital representation 209 be made. Indeed, the marking technique provides an easy way of dividing the copies produced from a given digital representation into subsets, with all of the copies of the subset having a common mark. Of course, depending on the manner in which the subdivisions are selected, the mark may both be a fingerprint for a copy and identify further subsets to which the particular copy belongs.

In distributed systems, for example those made up of clients and servers, different parts of the marking operation may be carried out at different points in the distributed system. Examples include the following:

The pre-watermarked versions 115 may be stored in a server; a client who is requesting the digital representation 103 can send authenticating information and the server can respond when the client has been authenticated by assembling a marked copy 209 and providing the marked copy to the client.

A server may provide the pre-watermarked versions to a client device such as a printer or CD maker that produces hard copy and the client device may assemble the marked copy and make the hard copy version of the digital representation.

Clients managing devices such as printers or CD makers may receive a copy of the digital representation from the server whose further copies are to be marked and create the versions with the distinguishable subdivisions and then assemble the versions.

Where the mark is a digital fingerprint, each copy of the content which is delivered to a customer must be fingerprinted, regardless of the way in which it is delivered:

1) Physical delivery of a medium containing the content: each CD-Rom, DVD copy, or printed copy is fingerprinted
2) Dedicated delivery: each copy of the movies that are delivered to movie houses is fingerprinted
3) Streaming: Each streaming copy is fingerprinted
4) Downloading: each downloaded copy is fingerprinted
5) Broadcasting (subscription or pay-per-view): Each set-top-box fingerprints the content it receives.

As can be seen from the foregoing, copies may be individually distributed, in which case the fingerprinting can be done at a central location. Where copies are broadcast, the fingerprinted must be done locally, for example in the printer that prints a document or in the set-top box that decodes a pay-per-view digital representation.

Further Implementations and Uses of the Technique

Other Uses of the Technique

While the technique is particularly advantageous for fingerprinting digital representations, it is not limited to this application, but can be used in any situation where it is useful to make a mark in a digital representation. For example, the mark might contain an encoded message. If subdivision selection string 205 represented a time-date stamp, the mark could be a time-date stamp for the digital representation. Similarly, if subdivision selection string was made by hashing the name of the owner of the digital representation, the mark would identify the owner. Fingerprints may of course both carry messages and uniquely identify the digital representation. The digital representation to which the technique is applied may also be a component of a larger digital representation. For example, the digital representation may be of product packaging, and the component to which the technique is applied may be a digital representation of a barcode that is part of the product packaging.

Ways of Making Watermarks

Many variations in the manner of making the watermarks in the subdivisions are possible. At a minimum, the watermark in a subdivision may be a change in the value of a single bit in the subdivision. The number of bits in the watermark may be increased as required for robustness or ease of detection, and the watermarks may also serve to carry messages and to detect alteration of the subdivision. Robustness is of course particularly important where the watermarked digital representation undergoes lossy transformations, for example, where it is printed, the printed copy is scanned, and the watermark is detected from the scanned copy. There is further no requirement that each subdivision have the same watermark; all that is required is that there is a clear association between a given subdivision and a given watermark. The number of subdivisions that are watermarked in a digital representation depends on the purpose of the watermark; when the watermark is a fingerprint, the number of subdivisions is determined at a minimum by the number of copies that need to be uniquely marked. Of course, it may be worthwhile to apply the fingerprint to the digital representation more than once. Moreover, if there are a great many subdivisions in the digital representation, a key could be used to select the subdivisions to which the watermarks are applied in digital representations 115($x$ and $y$). Another approach would be to have assembler 203 assemble representation 209 from three copies of streamed digital representation 107: watermarked digital representations 115($x$ and $y$) and an unwatermarked copy of streamed digital representation 107, with a key determining which subdivisions are selected from the unwatermarked copy and the watermarked copies and subdivision selection string 205 determining which watermarked copy a particular subdivision that has been selected for watermarking comes from.

Different Numbers of Pre-Watermarked Digital Representations

While the exemplary implementation of FIGS. 1 and 2 employs two pre-watermarked streamed digital representations 115($x$ and $y$), a set of any number of such digital representations may be used. All that is required is that subdivisions belonging to any one of the pre-watermarked streamed digital representations are distinguishable from corresponding subdivisions belonging to any of the other pre-watermarked streamed digital representations and that for any particular set, each element of subdivision selection string 205 have a value which specifies only one digital representation in the set. Thus, if there were three pre-watermarked streamed digital representations 115($x$, $y$, and $z$), each one with a different watermark in its subdivisions, each element of subdivision selection string 205 would have one of three values, for example, 0, 1, or 2. One reason for using more than 2 pre-watermarked streamed digital representations is to increase the number of unique fingerprints that can be made from a given number of watermarked subdivisions. For example, with three streamed digital representations, the number of fingerprints that may be made from n subdivisions is $3^n$.

Obtaining Values for Subdivision Selection String 205

The techniques used to obtain the values of subdivision selection string 205 depend completely on the purpose for which the watermark is being applied to digital representation 209. Where the watermark is being used to carry a message, the form of selection string 205 will depend on the message and how it is encoded. For example, in a streamed digital representation, the watermark might include a digest of the transaction information; where the watermark is being used to detect alterations, that purpose will determine the form of string 205. In fingerprinting applications, any technique can be used to make subdivision selection string 205 which will produce unique values. One simple technique for obtaining unique values is to use a counter; the counter is incremented each time a fingerprinted digital representation is made and subdivision selection string 205 for the next copy is derived from the incremented value. A technique which offers more security is to use a random number generator to randomly select a value in the range of possible values of the subdivisions selection string 205, with each value in the range being used only once. Where copies of the digital representation are being distributed by different parties, subranges of the possible values of string 205 may be assigned to the parties. Still more security is possible by using a secret key to generate the value of subdivisions selection string 205.

Associating Marks with Other Information

A digital fingerprint or other mark may of course be associated with any kind of information that is useful with regard to the fingerprinted digital representation. To give two examples:

If the fingerprinted digital representation is an ID document, the fingerprint may be associated with the document's issuer, the document's printing time, the serial number for the station at which it was printed, and the information concerning the printer from which it was printed.

If the fingerprinted digital representation is streamed media such as audio or video, it may contain transaction information such as the transaction's ID, the user's login name, the user's IP address, the amount to be collected from the user, and so forth.

A simple way of making the association is to include the subdivision selection string 205 that was used to make the fingerprint for the digital representation in the database record that describes the transaction. When a questionable fingerprinted digital representation is received, the subdivision selection string 205 used to make the fingerprint can be determined from the fingerprint and can then be used to query the database for the transaction record for the transaction. The association can also be encoded as a message in the fingerprint itself; for example, subdivision selection string 205 can include a digest made from transaction information concerning the streamed digital representation 209.

Kinds of Subdivisions

A subdivision may be any distinguishable portion of the digital representation. For example, the digital representation could be arbitrarily divided into 64-bit long portions, and these can serve as the subdivisions. Division could also be done using keys to determine the size and locations of the subdivisions to be watermarked. In many cases, of course, the digital representation contains functional subdivisions which may carry the distinguishing features. With digital representations that are compressed and/or encoded, the subdivisions may be selected as in the example after the digital representation has been compressed and/or encoded or the subdivisions and the distinguishing features may be selected such that the distinguishability of the subdivisions and the sequence of subdivisions are not affected by further compression and/or encoding. Common examples of functional subdivisions follow:

Images

For a still JPEG encoded image, the subdivision can be one of the followings:

In the following N is the number of horizontal elements; M of vertical elements, while N can be but does not have to be equal to N.
1) a N×M block, including a 8×8 block
2) a sequence of N×M blocks which may represent a N-pixel row of image or a M-pixel column of image
3) the N×M coefficients in a transform domain (e.g. DCT, Wavelet, . . . ) of a N×M-pixel block
4) a sequence of N×M coefficients in a transform domain of a N×M block, which may represent a N-pixel row of image or a N-pixel column of image Video For a MPEG encoded video (MPEG-1, MPEG-2, or a MPEG-4 video), the subdivision can be one of the followings:
1) all cases defined above for JPEG applied to frames of the MPEG video
2) a macroblock defined in the MPEG standards
3) a frame
4) a group of N frames
5) a fixed time interval Audio For a MPEG audio (MPEG-1 Audio Layer 1-3), the subdivision can be one of the followings:
1) a frequency
2) a frame as defined in the MPEG standard
3) an audio channel of multi-channel (e.g. stereo) transmission Plain Text For plain text, the subdivision can be one of the followings:
1) a sentence
2) a paragraph
3) a section
4) a page
5) a graphic Formatted Documents For formatted documents such as Windows Word files or PDF file, the subdivision can be one of the followings:
1) All cases of Section 4.4. for the plain text which may be extracted from the formatted documents
2) A line Program Code For program code, the subdivision can be one of the followings:
1) A Boolean expression
2) A conditional statement (IF-statement)
3) A loop statement (FOR-statement)
4) A subroutine or a function
5) A class Bar Code For standard bar codes (including 2D barcode), the media unit can be one of the followings:
1) A unit of bars (symbol) represents a digit.
2) A symbol Network Stream In a network stream the data is already formatted to be transmitted over a computer network. The subdivision can be:
1) A packet
2) A size data unit of a fixed size
A data unit determined by a time interval Applications of the Techniques The techniques described above can be used in any application where digital representations must be marked "on the fly". The techniques are particularly valuable where large numbers of differing watermarks must be generated, for example for fingerprinting. Typical applications in which the techniques are useful include:
1) video on demand
2) online music streaming or download
3) confidential email distribution
4) electronic distribution of confidential documents Using the Techniques to Make Watermarks that are Robust Against Collusion Attacks Additionally, the high-speed fingerprinting provided by the proposed solution provides digital watermarks that are robust against collusion attacks. A collusion attack can occur whenever multiple copies of watermarked digital representations are distributed. Two or more recipients of the watermarked digital representations work together and compare their copies pixel by pixel. If the watermarks are the same in both watermarked digital representations, they can be located and removed; if they are different, the watermarks can be removed or weakened by operations, such as taking the averages of corresponding pixel values in the multiple copies.

When the digital representations are fingerprinted, each fingerprint may also serve as an "anti-collusion unit" in the digital representation. By definition, each fingerprint contains a set of bits with values that are unique to the copy of the digital representation to which the fingerprint belongs. By analyzing presence of these "exclusive" bits in the attacked digital representation, one can determine which copies of the digital representation were used for the collusion and from the information associated with the fingerprints, the parties involved in the collusion. In the case of an averaging attack, the averaged data must also contain an average of the watermarks in the individual copies that are averaged. The similarity between the averaged watermark and each watermark in the distributed copies indicates the collusion sources (i.e. the copies are used for averaging). In the simplest case, an "anti-collusion" unit consists of one embedded '0' and many embedded '1's'. The position of the '0' in each "anti-collusion" unit uniquely identifies the copy. By locating the '0' values from the attacked copies, one can identify which copies have been used. The number of anti-collusion units, and thus the number of copies which can be protected can be increased by using more complex watermarking schemes. These schemes could employ different watermarking methods in parallel, e.g. watermarks in the frequency and spatial or color domains.

Using Marks to Protect Brands

Since certain kinds of marks may also be preserved in the digital representation's analog (printed, played, or displayed) form, marks made according to the techniques described herein can also be used in brand protection, deterrence of counterfeiting, tracing, and tracking the distribution. In this application, a mark is embedded into the graphics printed on product packages or printed as a label which is in turn attached to the product packaging. One of best places to embed the mark is on a barcode in the packaging. One example of watermarking barcodes is to assign a unique code for each distributor/customer and embed the code in a barcode on the packaging of the products that are delivered to this distributor/customer.

Figure 3:
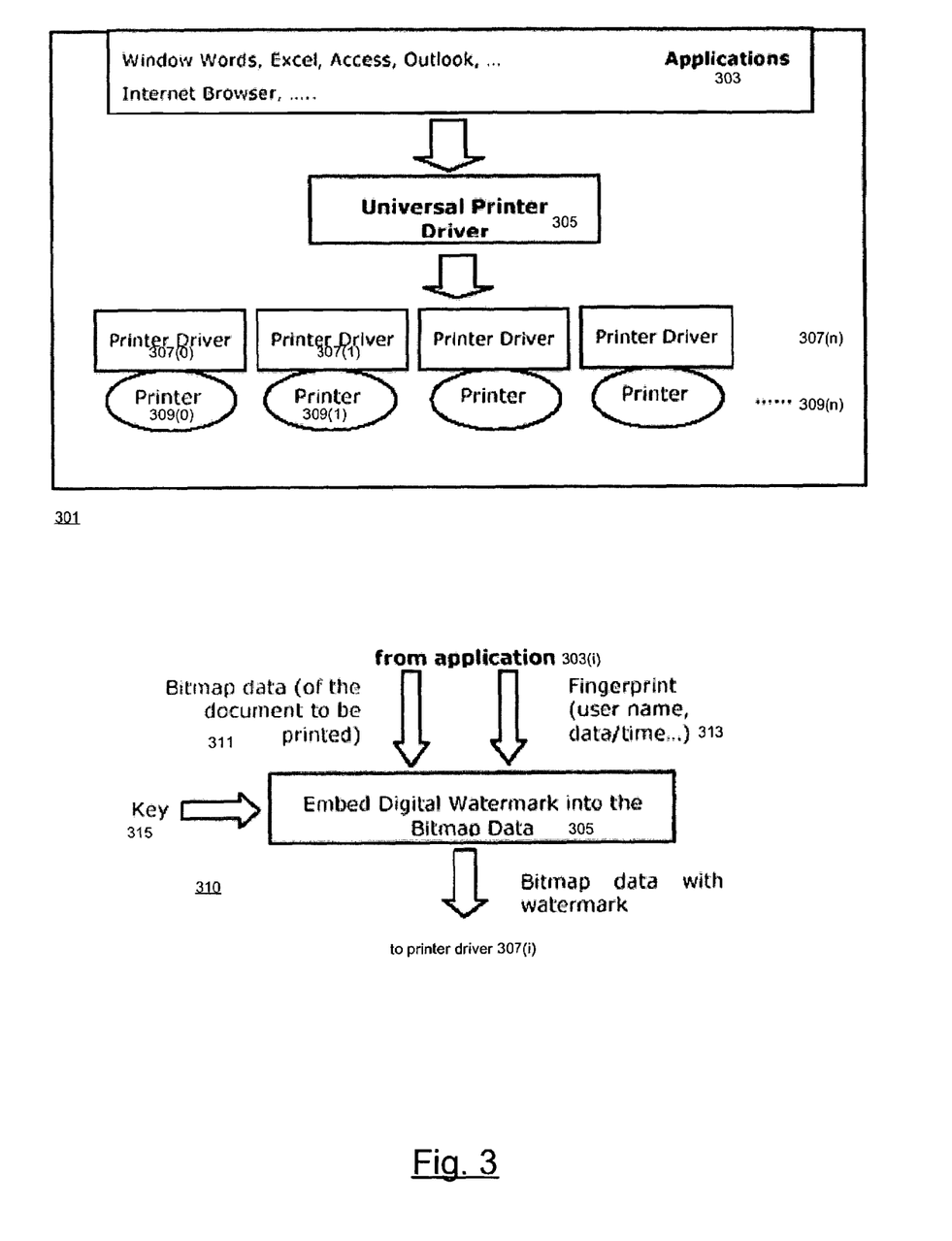
FIG. 3 shows a universal printer driver which may be used to fingerprint individual printed documents.

Deterrence, Forensic Trace, and Tracking: FIG. 3

Another application of the techniques described above is to fingerprint individual documents printed from digital representations. To do this, each printer used to print the documents must have a fingerprint writer installed either in the driver or as firmware in the printer itself. The fingerprint writer has access to one or more pre-marked copies of the digital representation of the document and uses the technique to embed a unique fingerprint into the bitmap file of each document to make it traceable. Information may be encoded in the fingerprint which identifies the user (who is printing the document), the place (from which computer or IP address the printing job is initiated), the printer (manufacturer and model, the manufacture date and place, series number), time and date when the document is printed, and/or the purchaser of the printer (the customer ID, address, . . . ). The technique may be employed with any printing technology including laser, film offset, digital offset, inkjet, thermo, or dots and may be applied to any kind of object that can be printed, including ID cards, passports, contracts that are printed on various surfaces (plastic, paper, metal, rubber, or packaging.

A Universal Printer Driver (UPD) may be used to make the technique independent of particular printers or drivers. As shown at 301 in FIG. 3, universal printer 305 driver sits between the application software 303 (Web browser, Microsoft Word, Excel . . . ) and the individual driver 307(*i*) of each printer 309(*i*). Details of the universal printer driver are shown at 310. A particular application 303(*i*) provides the bitmap data 311 for the document to be printed to universal printer driver 305 along with the information 313 from which subdivision selection string 205 (here, key 315) is made. Bitmap data 311 may include the pre-watermarked copies of the document, or the pre-watermarked copies may be made in universal printer driver 305. Universal printer driver 305 then assembles subdivisions from the pre-watermarked copies as described above to make the version of the document to be printed, and this version is output to a particular printer driver 307(*i*) and thence to its corresponding printer 309(*i*). To make sure all documents produced are watermarked, end users may be required to print the documents using the universal printer driver.

One reason for marking documents is to deter people from stealing or leaking them. Fingerprints are of course particularly useful here. The fingerprint is dynamically generated per printing request and may include the user name, IP address of the computer, the time and date, the document name and serial number, and can thus be used to determine the source of a leaked or stolen document. Another reason for fingerprinting documents is deterring alteration of a printed document by fingerprinting the document with a fingerprint derived from the document's content when the document is printed. In this application, the techniques described in U.S. Pat. No. 6,243,480, Jian Zhao, et al., Digital authentication with analog documents, issued Jun. 5, 2001 may be applied.

CONCLUSION

The foregoing Detailed Description has disclosed to those skilled in the relevant technologies how to make and use their techniques for marking digital representations and have further disclosed the best mode presently known to the inventors for implementing their techniques. It will be immediately apparent to those skilled in the relevant technologies that the techniques disclosed herein are very general. The techniques may be applied to any digital representation, the subdivisions may be arbitrary or functional, they may have fixed or varying lengths, and their location and sizes may be determined using keys or other cryptographic techniques. The subdivisions in the different versions of the digital representation may be distinguished from one another in any manner which is useful for the purpose of the marking and which is compatible with the manner in which the digital representation is normally used. Similarly, the manner in which the sequences are selected will depend completely on the purpose of the marking and the kinds of information that are to be encoded therein. When the techniques are implemented in distributed systems, the operations involved in the techniques may be distributed among components of the distributed system in any way that is useful. For all of the foregoing reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

What is claimed is:

1. A method for use in a watermarking device comprising:
   making a plurality of versions of a digital representation in said watermarking device, each of the versions having a plurality of corresponding subdivisions, the subdivisions in a given version being distinguishable from the corresponding subdivisions in each of the other versions by prewatermarking the subdivisions of the given version with a digital watermark;
   selecting the prewatermarked subdivisions from the given version according to a selection string, the selection string having a plurality of elements, each of the elements corresponding to a different prewatermarked subdivision, and each element's value specifying the given version; and
   assembling a marked copy from the selected prewatermarked subdivisions of the given version according to the selection string, whereby the marked copy's watermark is the sequence of prewatermarked subdivisions of the given version.

2. The method set forth in claim 1 wherein:
   the subdivisions are made distinguishable in a way which does not affect the manner in which the digital representation is normally used.

3. The method set forth in claim 1 wherein:
   the subdivisions are made further distinguishable by means of distinguishable headers associated therewith.

4. The method set forth in claim 1 wherein:
   the subdivisions are made further distinguishable by encoding the subdivisions such that they are distinguishable.

5. The method set forth in claim 1 wherein:
   the subdivisions are made distinguishable such that encoding and/or compression of the digital representation does not render the subdivisions indistinguishable.

6. The method set forth in claim 1, wherein:
the sequence of subdivisions encodes information about the marked copy.

7. The method set forth in claim 6 wherein:
the encoded information concerns a transaction involving the marked copy.

8. The method set forth in claim 6 wherein:
the encoded information renders the marked copy traceable.

9. The method set forth in claim 6 wherein:
the encoded information is encoded from information that is contained in the marked copy.

10. The method set forth in claim 1 wherein:
a plurality of marked copies are assembled in assembling a marked copy from the plurality of versions; and
the sequences of prewatermarked subdivisions identify subsets of the plurality of marked copies.

11. The method set forth in claim 1 wherein:
a plurality of marked copies are assembled in assembling a marked copy from the plurality of versions; and
each of the plurality of marked copies has a unique sequence of prewatermarked subdivisions.

12. The method set forth in claim 11 wherein:
the unique sequence of prewatermarked subdivisions further encodes information about the marked copy.

13. The method set forth in claim 1 wherein:
a plurality of marked copies are assembled in assembling the marked copy from the plurality of versions; and
the sequences of prewatermarked subdivisions in the marked copies function as anti-collusion units.

14. The method set forth in claim 1 wherein:
a plurality of marked copies are assembled in the step of assembling the marked copy from the plurality of versions; and
there are sufficient versions and sufficient prewatermarked subdivisions in the versions that the sequence of prewatermarked subdivisions specified by the selection string for each marked copy may be unique to the marked copy.

15. The method set forth in claim 1 further comprising the step of:
transferring the assembled marked copy to a client.

16. The method set forth in claim 15 further comprising the step of:
verifying that the client may receive the marked copy, assembling being performed only if the verifying is successful.

17. The method set forth in claim 1 further comprising the step of:
transferring the digital representation to a client; and
making a plurality of versions and assembling the marked copy are performed in the client.

18. The method set forth in claim 1 further comprising the step of:
transferring the plurality of versions to a client; and
the step of assembling the marked copy is performed at the client.

19. The method set forth in claim 1 wherein:
the elements' order in the selection string corresponds to the prewatermarked subdivisions' order in the versions of the digital representation and to the selected prewatermarked subdivisions' order in the marked copy.

20. The method set forth in claim 1 wherein:
the digital representation comprises 3 versions,
'n' represents the number of prewatermarked subdivisions, and
a total number of watermarks is equal to $3^n$.

21. The method set forth in claim 1 wherein:
a subdivision comprises a frame.

22. The method set forth in claim 1 wherein:
a subdivision comprises a group of frames where N is greater than 1.

23. The method set forth in claim 13 wherein:
an anti-collusion unit comprises one embedded binary digit value and a plurality of embedded binary digits of the other binary digit value.

24. The method set forth in claim 1 wherein:
a server provides the given version of prewatermarked subdivisions to a client, the client assembling the marked copy.

25. A method for use in a watermarking device comprising:
making a plurality of versions of a digital representation in said watermarking device, each of the versions having a plurality of corresponding subdivisions, the subdivisions in a given version being distinguishable from the corresponding subdivisions in each of the other versions by encoding the subdivisions such that they are distinguishable,
selecting the distinguishably encoded subdivisions from the given version according to a selection string, the selection string having a plurality of elements, each of the elements corresponding to a different distinguishably encoded subdivision, and each element's value specifying the given version; and
assembling a marked copy from the selected distinguishably encoded subdivisions of the given version according to the selection string, whereby the marked copy's watermark is the sequence of distinguishably encoded subdivisions of the given version.

* * * * *